US009091281B2

(12) United States Patent
Quinnell et al.

(10) Patent No.: US 9,091,281 B2
(45) Date of Patent: Jul. 28, 2015

(54) SYSTEM FOR ALLOCATING FLUID FROM MULTIPLE PUMPS TO A PLURALITY OF HYDRAULIC FUNCTIONS ON A PRIORITY BASIS

(75) Inventors: Corey K. Quinnell, West Allis, WI (US); Joseph L. Pfaff, Wauwatosa, WI (US); Jonathan M. Starkey, Glossop (GB); Eric P. Hamkins, Waukesha, WI (US)

(73) Assignee: HUSCO International, Inc., Waukesha, WI (US)

(*) Notice: Subject to any disclaimer, the term of this patent is extended or adjusted under 35 U.S.C. 154(b) by 641 days.

(21) Appl. No.: 13/420,851

(22) Filed: Mar. 15, 2012

(65) Prior Publication Data

US 2012/0233996 A1 Sep. 20, 2012

Related U.S. Application Data

(60) Provisional application No. 61/452,885, filed on Mar. 15, 2011.

(51) Int. Cl.

| | |
|---|---|
| ***F16D 31/02*** | (2006.01) |
| ***F15B 7/00*** | (2006.01) |
| ***F15B 11/17*** | (2006.01) |
| ***E02F 9/22*** | (2006.01) |
| ***F15B 11/16*** | (2006.01) |

(52) U.S. Cl.

CPC ............... *F15B 7/003* (2013.01); *E02F 9/2235* (2013.01); *E02F 9/2242* (2013.01); *E02F 9/2282* (2013.01); *E02F 9/2285* (2013.01); *E02F 9/2292* (2013.01); *E02F 9/2296* (2013.01); *F15B 11/165* (2013.01); *F15B 11/17* (2013.01); *F15B 2211/20546* (2013.01); *F15B 2211/253* (2013.01); *F15B 2211/3116* (2013.01); *F15B 2211/6052* (2013.01); *F15B 2211/654* (2013.01)

(58) Field of Classification Search

CPC ........ F15B 7/003; F15B 11/165; F15B 11/17; F15B 13/06; E02F 9/2242; E02F 9/2282; E02F 9/2292

USPC .................... 60/421, 422, 428, 445, 484, 486

See application file for complete search history.

(56) References Cited

U.S. PATENT DOCUMENTS

| | | | | |
|---|---|---|---|---|
| 3,922,855 A * | 12/1975 | Bridwell et al. | ................ | 60/421 |
| 3,970,108 A | 7/1976 | Ailshie | | |
| 4,470,260 A | 9/1984 | Miller et al. | | |
| 4,573,319 A | 3/1986 | Chichester | | |

(Continued)

FOREIGN PATENT DOCUMENTS

| | | |
|---|---|---|
| EP | 1191233 | 3/2002 |
| EP | 1895060 | 3/2008 |

*Primary Examiner* — Michael Leslie

(57) ABSTRACT

A valve assembly has a flow summation node coupled to a displacement control port of the first pump. Each valve in the assembly has a variable metering orifice controlling flow from an inlet to a hydraulic actuator and has a variable source orifice conveying fluid from a supply conduit to a flow summation node. The source orifice enlarges as the metering orifice shrinks. Each valve includes a variable bypass orifice and the bypass orifices of all the control valves are connected in series forming a bypass passage between a bypass node and a tank. The bypass node is coupled to the flow summation node and receives fluid from a second pump. At each valve, a source check valve conveys fluid from the supply conduit to the inlet and a bypass supply check valve conveys fluid from the bypass passage to the inlet.

36 Claims, 5 Drawing Sheets

(56) References Cited

U.S. PATENT DOCUMENTS

| | | | |
|---|---|---|---|
| 4,665,698 | A | 5/1987 | Trusock |
| 5,052,179 | A | 10/1991 | Fujii |
| 5,083,428 | A | 1/1992 | Kubomoto et al. |
| 5,319,933 | A | 6/1994 | Omberg et al. |
| 5,361,211 | A | 11/1994 | Lee et al. |
| 5,413,452 | A | 5/1995 | Lech et al. |
| 5,446,979 | A | 9/1995 | Sugiyama et al. |
| 5,579,642 | A | 12/1996 | Wilke et al. |
| 5,615,553 | A | 4/1997 | Lourigan |
| 5,896,943 | A | 4/1999 | Christensen |
| 5,937,645 | A | 8/1999 | Hamamoto |
| 5,950,429 | A | 9/1999 | Hamkins |
| 6,018,895 | A | 2/2000 | Duppong et al. |
| 6,029,445 | A | 2/2000 | Lech |
| 6,134,887 | A | 10/2000 | Bertotti et al. |
| 6,318,079 | B1 | 11/2001 | Barber |
| 6,976,357 | B1 | 12/2005 | Pfaff |
| 7,222,484 | B1 | 5/2007 | Dornbach |
| 7,275,370 | B2 | 10/2007 | Hesse et al. |
| 7,290,389 | B2 | 11/2007 | Singh |
| 7,513,109 | B2 | 4/2009 | Toji et al. |
| 2003/0019681 | A1 | 1/2003 | Nakamura |
| 2010/0236232 | A1 | 9/2010 | Boehm et al. |
| 2011/0056192 | A1 | 3/2011 | Weber et al. |
| 2011/0262287 | A1 | 10/2011 | Cho et al. |

* cited by examiner

SYSTEM FOR ALLOCATING FLUID FROM MULTIPLE PUMPS TO A PLURALITY OF HYDRAULIC FUNCTIONS ON A PRIORITY BASIS

CROSS-REFERENCE TO RELATED APPLICATIONS

This application claims benefit of U.S. provisional patent application No. 61/452,885 filed on Mar. 15, 2011, the disclosures in which are incorporated herein by reference as if set forth in their entirety herein.

STATEMENT REGARDING FEDERALLY SPONSORED RESEARCH OR DEVELOPMENT

Not Applicable.

BACKGROUND OF THE INVENTION

1. Field of the Invention

The present invention relates to hydraulic systems having a plurality of pumps and a plurality of independently controllable hydraulic actuators; and more particularly to controlling the plurality of pumps and allocating the resultant fluid flow to the plurality of hydraulic actuators.

2. Description of the Related Art

Hydraulic systems have at least one hydraulic pump that supplies pressurized fluid which is fed through control valves to drive several different hydraulic actuators. A hydraulic actuator is a device, such as a cylinder-piston arrangement or a hydraulic motor that converts the flow of hydraulic fluid into mechanical motion.

Because loads of different magnitudes act on the various hydraulic actuators, the hydraulic pressure required to operate each actuator can vary greatly at any point in time. On an earth excavator, for example, the hydraulic actuators that raise the boom typically require a relatively high pressure as compared to other actuators that curl the bucket or move the arm. Thus, when the operator is raising the boom at the same time the arm or bucket are also moving, a significant portion of the fluid flow from the pump will go to the lower pressure hydraulic actuators. Without some further compensation mechanism, this deprives the boom actuator of the necessary fluid required to operate as commanded. To maintain the proper flow sharing among all the actuators, the hydraulic systems use complex throttling mechanisms that add a pressure drop to the lower pressure functions and prevent them from consuming a disproportionately large amount of the fluid flow at times when multiple actuators are operating. Different equipment manufacturers use different throttling mechanisms. Some of these mechanisms use pressure compensators and a load sensing pump, while other ones use pilot pressure signals from the operator controls to create throttling losses for the low pressure functions. All these throttling losses generate heat and add inefficiency to the hydraulic system in order to enable the multifunction operation commanded by the machine operator.

It is desirable to avoid these intrinsic losses in efficiency and energy while still maintaining the multifunction performance desired by the operator.

The hydraulic system on many larger machines has multiple pumps that supply pressurized fluid for powering the various hydraulic actuators. One pump may be dedicated to supplying fluid to only selected actuators, while another pump furnishes fluid to the remaining actuators. A fixed assignment of hydraulic actuators to a given pump is inefficient when those hydraulic actuators are not consuming fluid and their pump is in a state of relative low use while a different pump for other hydraulic actuators is experiencing a heavy fluid demand. In other systems certain hydraulic actuators are powered by fluid from multiple pumps, in which case a mechanism is necessary for sharing the available fluid among those hydraulic actuators.

Therefore, it is desirable to allocate dynamically the fluid output from multiple pumps in an efficient manner, while recognizing the need for certain hydraulic actuators to have priority over other hydraulic actuators regarding the use of the available fluid.

SUMMARY OF THE INVENTION

A hydraulic system includes a variable displacement first pump and a second pump that supply fluid from a tank to a plurality of hydraulic functions. Each hydraulic function includes a hydraulic actuator and a control valve that governs application of fluid from one or both of the pumps to the hydraulic actuator. The control valves are part of a unique control valve assembly.

The control valve assembly includes a supply conduit connected to convey fluid from the first pump to the plurality of hydraulic functions, a return conduit for conveying fluid back to the tank, and a plurality of control valves. Each control valve has an inlet operatively coupled to receive fluid from the supply conduit and has a variable metering orifice for controlling flow of fluid from the inlet to a hydraulic actuator. Each of the plurality of control valves also includes a variable bypass orifice, wherein all those bypass orifices are connected in series between a bypass node and the return conduit. That series connection of the bypass orifices forms a bypass passage. Preferably, the variable bypass orifice of a given control valve decreases in size as the variable metering orifice of that given control valve increases in size. The bypass node is operatively connected to receive fluid from the second pump.

A plurality of source check valves and a plurality of bypass supply check valves are provided. At each control valve, a source check valve conveys fluid from the supply conduit to the inlet, and a bypass supply check valve conveys fluid from the bypass passage to the inlet.

Another aspect of the present control valve assembly is another control valve with an inlet connected to receive fluid only from the supply conduit.

A further aspect of the present control valve assembly is an additional control valve with an inlet connected to receive fluid only from the bypass passage.

Yet another aspect of the present control valve assembly is a displacement control circuit that controls the displacement of the first pump in response to demand for fluid by the plurality of hydraulic functions. In one embodiment, the displacement control circuit comprises a flow summation node coupled to a control port for the first pump. Then each of the plurality of control valves has a variable source orifice through which fluid flows from the supply conduit to the flow summation node, wherein the variable source orifice increases in size as the variable metering orifice in the same control valve increases in size.

DETAILED DESCRIPTION OF THE INVENTION

The term "directly connected" as used herein means that the associated components are connected together by a conduit without any intervening element, such as a valve, an orifice or other device, which restricts or controls the flow of fluid beyond the inherent restriction of any conduit. If a component is described as being "directly connected" between two points or elements, that component is directly connected to each such point or element.

Although the present invention is being described in the context of use on an earth excavator, it can be implemented on other types of hydraulically operated equipment.

Figure 1:
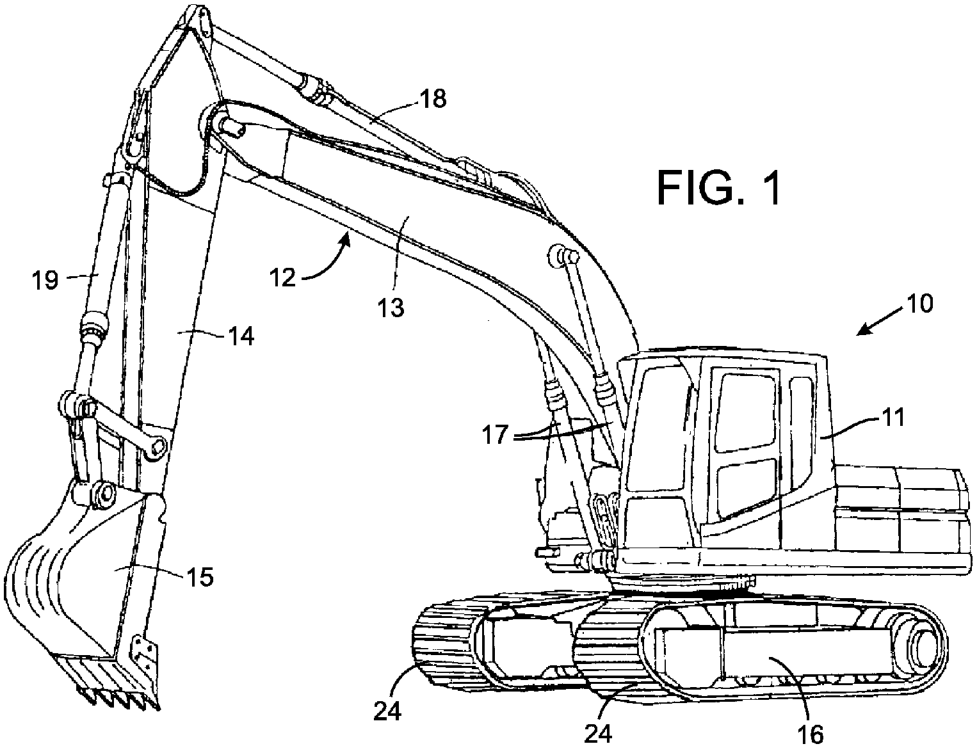
FIG. 1 is a pictorial view of an excavator with a hydraulic system that incorporates a control valve assembly according to the present invention.

With initial reference to FIG. 1, an excavator 10 comprises a cab 11 that can swing clockwise and counter-clockwise on a crawler 16. A boom assembly 12, attached to the cab, is subdivided into a boom 13, an arm 14, and a bucket 15 pivotally attached to each other. A pair of hydraulic piston-cylinder assemblies 17, that are mechanically and hydraulically connected in parallel, raise and lower the boom 13 with respect to the cab 11. On a typical excavator, the cylinder of these assemblies 17 is attached to the cab 11 while the piston rod is attached to the boom 13, thus the force of gravity acting on the boom tends to retract the piston rod into the cylinder. Nevertheless, the connection of the piston-cylinder assemblies could be such that gravity tends to extend the piston rod from the cylinder. The arm 14, supported at the remote end of the boom 13, can pivot forward and backward in response to operation of another hydraulic piston-cylinder assembly 18. The bucket 15 pivots at the tip of the arm when driven by yet another hydraulic piston-cylinder assembly 19. The bucket 15 can be replaced with other work implements.

Figure 2:
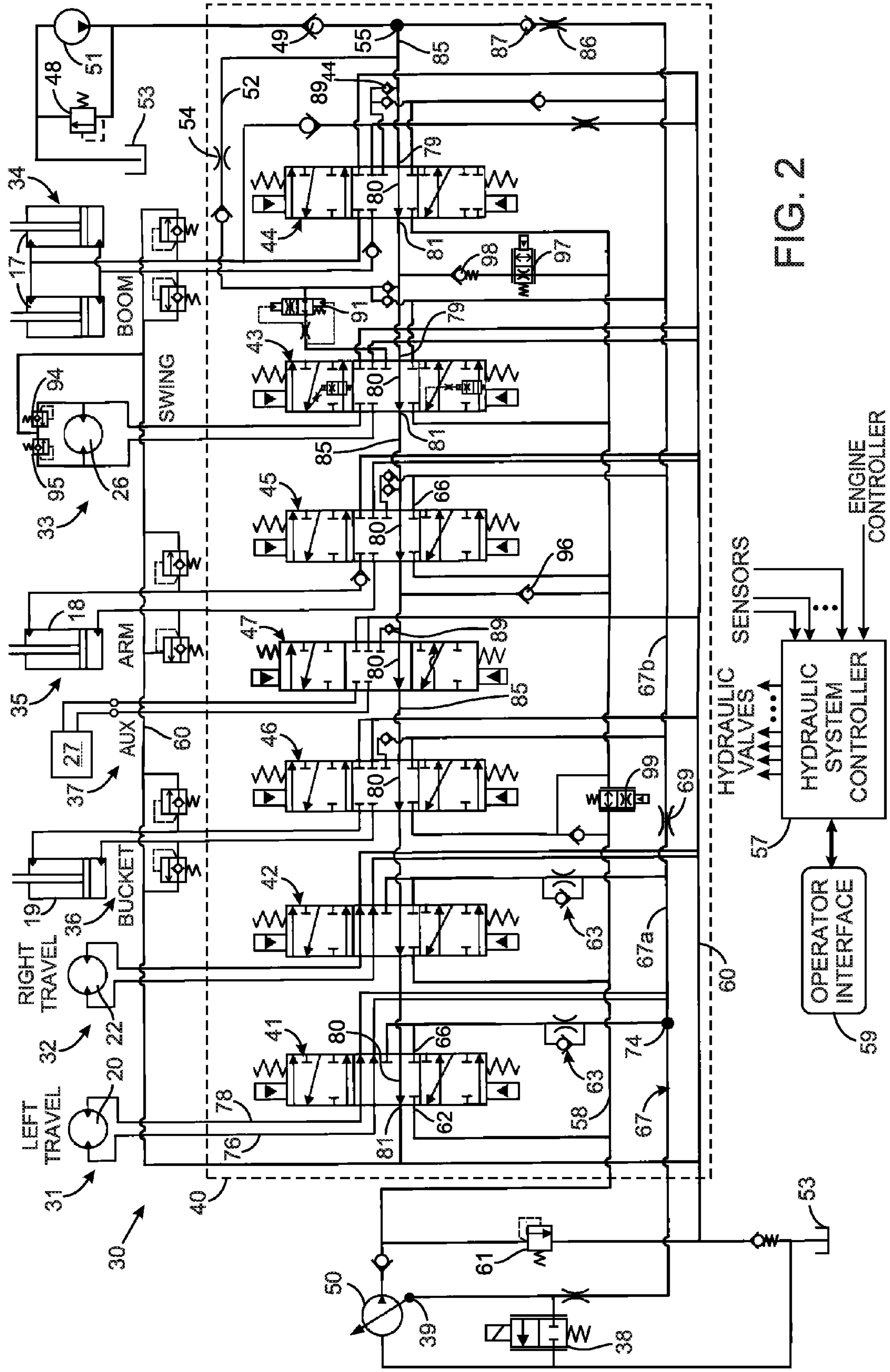
FIG. 2 is a diagram of a first hydraulic system for the excavator.

With additional reference to FIG. 2, a pair of left and right bidirectional travel motors 20 and 22 independently drive the tracks 24 to propel the excavator over the ground. A bidirectional hydraulic swing motor 26 selectively rotates the cab 11 clockwise and counterclockwise with respect to the crawler 16.

The hydraulic motors 20, 22 and 26 and the hydraulic piston-cylinder assemblies 17-19 on the boom assembly 12 are generically referred to as hydraulic actuators, which are devices that convert hydraulic fluid flow into mechanical motion. A given hydraulic system may include other types of hydraulic actuators.

With particular reference to FIG. 2, a hydraulic system 30 has seven hydraulic functions 31-37, although a greater or lesser number of such functions may be used in other hydraulic systems that practice the present invention. Specifically there are left and right travel functions 31 and 32 and a swing function 33. The boom assembly includes a boom function 34, an arm function 35, and a bucket function 36, referred to as implement functions. A seventh function 37 is provided for powering an auxiliary device, such as a hydraulic hammer for example.

Each hydraulic function 31, 32, 33, 34, 35, 36 and 37 respectively comprises a control valve 41, 42, 43, 44, 45, 46 and 47 and the associated hydraulic actuator 20, 22, 26, 17, 18, 19 and 27, respectively. The seven control valves 41-47 combine to form a control valve assembly 40. The control valves may be physically separate or combined in a single monolithic assembly. Six control valves 41-46 govern the flow of fluid to the associated hydraulic actuator from a variable-displacement first pump 50 and a fixed displacement second pump 51. Alternatively, the second pump 51 may be a variable-displacement pump, such as one with a positive or non-positive displacement or a load sense controlled pump. As an example, the maximum displacement of the first pump 50 may be 145 cubic centimeters and the maximum displacement of the second pump 51 may be 50 cubic centimeters. The first pump 50 furnishes pressurized fluid to a supply conduit 58 and the second pump 51 furnishes pressurized fluid to a bypass node 55 at the upstream end of a bypass passage 85. All the control valves 41-47 also govern the flow of fluid back from the associated hydraulic actuator into a return conduit 60 that leads to a tank 53.

The first pump 50 is a variable-displacement type such that the output pressure is equal to a pressure applied to a load sense control port 39 plus a fixed predefined amount referred to as the "pump margin". The first pump 50 increases or decreases its displacement in order to maintain the desired pressure. For example, if the difference between the outlet pressure and control input port pressure is less than the pump margin, the pump will increase the displacement. If the difference between the outlet pressure and control input port pressure is greater than the pump margin, then pump displacement is reduced. It is commonly known that flow through an orifice can be represented as being proportional to the flow area and the square root of differential pressure. Since this pump control method provides a constant differential pressure or "pump margin", the flow out of the first pump 50 will be linearly proportional to the flow area between the pump outlet and load sense control port 39.

Alternatively, the first pump 50 can be a positive displacement pump in which the displacement is controlled by an electrohydraulic device or a pilot operated device.

When multiple functions are demanding fluid, the first pump 50 may be at a relatively high displacement that can overload the engine driving the pump and potentially cause the engine to stall. This condition is detected by the engine controller which responds by providing an alert signal to a system controller 57 for the hydraulic system. The system controller 57 responds by operating the load sense power control valve 38 which opens by a proportional amount to reduce the pressure that is applied at the load sense control port to manage the outlet pressure of the first pump 50. This action reduces the load on the engine and prevents stalling.

The system controller 57, in addition to receiving input signals from various sensors on the excavator, also receives signals from input devices of an operator interface 59 in the cab 11. The system controller responds by producing signals that operate the valves in the first hydraulic system 30.

Each control valve 41-47 is an open-center, three-position valve, such as a spool type valve, for example, however other types of valves may be used. Although in the exemplary hydraulic system 30, the control valves 41-47 are indicated as being operated by a pilot pressure, one or more of them could be operated by a solenoid or a mechanical linkage.

Figure 3:
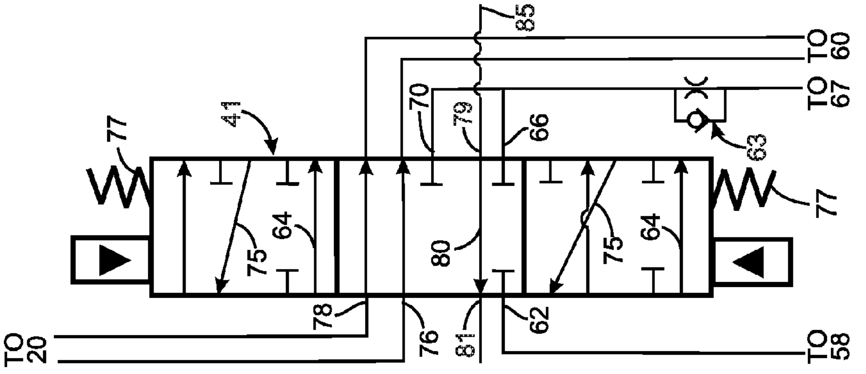

The first and second control valves 41 and 42 for the travel functions 31 and 32 are identical with the first control valve depicted in detail in FIG. 3. This spool type valve has a supply port 62 that is directly connected to the supply conduit 58 from the first pump 50. A variable flow source orifice 64 within the control valve provides fluid communication between the supply port 62 and a flow outlet 66. The flow outlet 66 is connected to a secondary supply conduit 67 by a function flow limiter 63 comprising a fixed orifice in parallel with a check valve.

The flow outlet 66 also is directly connected to a metering orifice inlet 70. A variable metering orifice 75 within the first control valve 41 selectively connects the metering orifice inlet 70 to one of two workports 76 and 78 depending upon the direction that the control valve is moved from the center, neutral position that is illustrated. The two workports 76 and 78 connect to different ports on the associated hydraulic actuator, such as actuator 20 in the left travel function 31. The first control valve 41 is normally biased by springs 77 into the center position in which both workports 76 and 78 are connected to the return conduit 60.

The first control valve 41 also has a variable bypass orifice 80 that is directly connected between a bypass inlet port 79 and a bypass outlet 81 of that control valve.

The other five control valves 43-47 are similar to the first control valve 41 with the same components and features being identified with identical reference numbers. The differences among those other valves now will be described.

Figure 4:
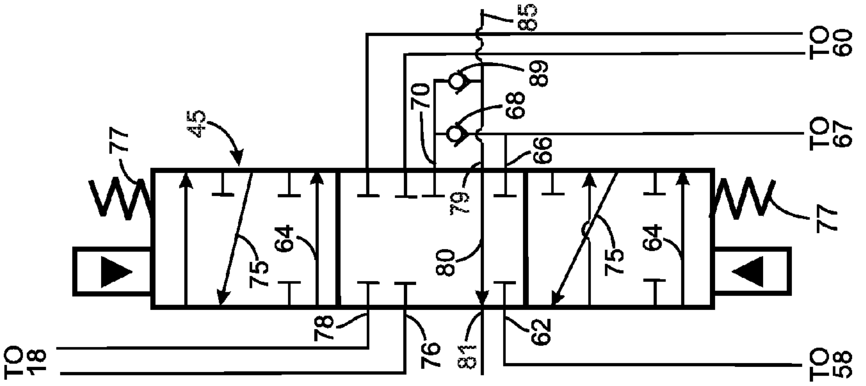

For the fifth control valve 45 shown in FIGS. 2 and 4, the flow outlet 66 is coupled to the metering orifice inlet 70 by a conventional source check valve 68. The metering orifice inlet 70 also coupled by a bypass supply check valve 89 to the bypass passage 85 at the bypass inlet port 79 side the control valve. The bypass supply check valve 89 allows fluid to flow from the bypass path 85 through the metering orifice 75 under certain operating conditions as will be described. The metering orifice inlet 70 of the fourth control valve 44 is coupled to the flow outlet 66 and the bypass passage 85 in the same manner.

Figure 5:
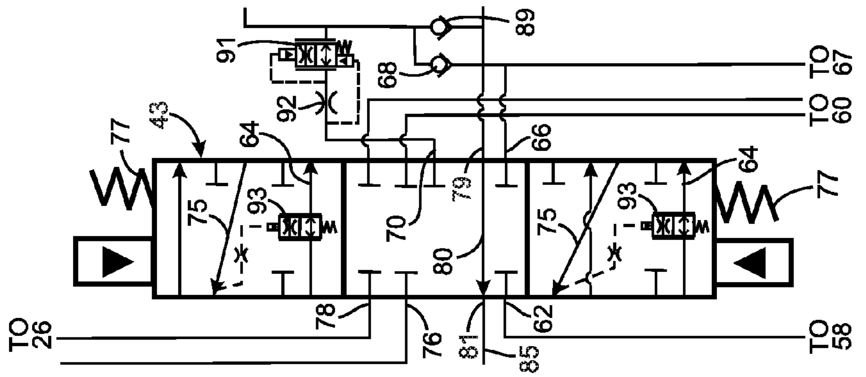

With reference to FIG. 5, the third control valve 43 for the swing function 33 has a similar coupling of the metering orifice inlet 70 to the flow outlet 66 and the bypass path 85. For the third control valve 43, however, the outlets of the source check valve 68 and the bypass supply check valve 89 are coupled to the metering orifice inlet 70 by a pilot-operated speed control valve 91 and a control orifice 92 connected in series. The speed control valve 91 responds to a pressure differential across the control orifice 92. As that pressure differential increases with increased flow, the speed control valve 91 proportionally closes restricting the fluid flow, which provides over speed protection to the swing function. The third control valve 43 also has an internal flow limit valve 93 that is pilot operated by pressure at the outlet side of the metering orifice 75. The flow limit valve 93 restricts fluid flow through the source orifice 64 of the third control valve when the swing function 33 is operating at maximum torque. Without that restriction at maximum torque, a swing pressure relief valve 94 or 95 would open a path to tank that wastes fluid flow produced by the pumps.

Figure 6:
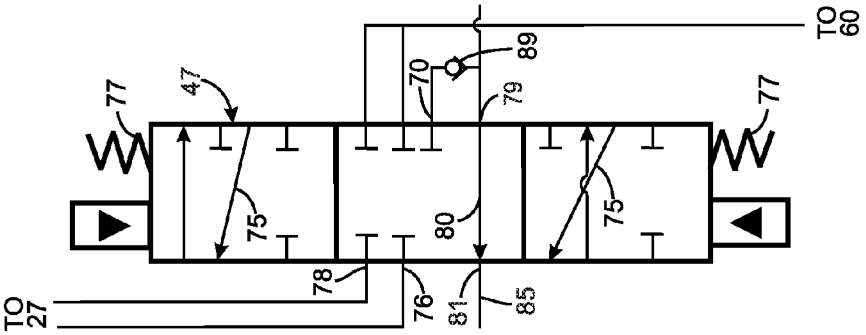
FIGS. 3, 4, 5 and 6 are enlarged diagrams of three control valves in the first hydraulic system.

As shown in FIGS. 2 and 6, the seventh control valve 47 for the auxiliary function 37 does not have a variable flow source orifice 64 that selectively provides fluid communication between a supply port 62 and a flow outlet 66 as in the other control valves. This is because the seventh control valve 47 does not receive fluid directly from the supply conduit 58 and thus does not exert control over the displacement of the first pump 50. Instead, the seventh control valve 47 is only supplied with fluid via the bypass path 85 through a bypass supply check valve 89.

Referring generally to FIG. 2, the flow outlets 66 of the first and second control valves 41 and 42 are coupled by their function flow limiter 63 to a flow summation node 74 defined in the secondary supply conduit 67. The flow outlets 66 of the third through sixth control valves 43-46 are directly connected to the a flow summation node 74. Thus, each adjustable flow source orifice 64 within a control valve provides a separate variable fluid path between the supply conduit 58 and the flow summation node 74.

The bypass orifices 80 for all the control valves 41-47 are connected in series to vary fluid communication through the bypass passage 85 between the flow summation node 74 and the return conduit 60. The summation node 74 is connected by the secondary supply conduit 67 to bypass node 55 at the upstream end of the bypass passage 85. In the exemplary hydraulic system 30, the bypass inlet port 79 of the fourth control valve 44 is connected to the bypass node 55. The bypass outlet 81 of the fourth control valve 44 is directly connected to the bypass inlet port 79 of the third control valve 43 whose bypass outlet 81 is directly connected to the bypass inlet port 79 of the fifth control valve 45 and so on through control valves 47, 46, 42 and 41. The bypass outlet 81 of the first control valve 41 is connected directly to the return conduit 60. Thus the series of the bypass orifices 80 in each control valve 41-47 is connected between the summation node 74 and the return conduit 60.

With continuing reference to FIG. 2, a two-position proportional cross coupling valve 97 is in series with a cross coupling check valve 98 the bypass passage 85 and the supply conduit 58. The cross coupling valve 97, which normally provides a flow restriction, opens in response to the commands for the travel functions 31 and 32. The cross coupling check valve 98 is oriented so that when pressure in the bypass passage 85 exceeds the pressure in the supply conduit 58 by at least a predefined level, the check valve opens to allow flow from the bypass passage into the supply conduit 58. The circuit branch, with the cross coupling valve 97 and the cross coupling check valve 98, is connected to the bypass passage 85 between the boom and swing functions 44 and 43, respectively. That circuit branch gives the swing function 33 priority to using the bypass passage flow over the arm and bucket functions 35 and 36. That priority is reduced by opening the cross coupling valve 97, so that the swing actuator 26 is not overdriven when a travel function 31 or 32 is activated. A travel priority valve 99 in the supply conduit 58 between the travel functions 31 and 32 and the bucket function 36 is similarly pilot operated by the travel commands to give the travel functions priority over the use of the fluid provided by the first pump 50.

A cross connect check valve 96 is operatively connected to enable fluid to flow from the bypass passage 85 into the supply conduit 58. The cross connect check valve 96 is connected to the bypass passage 85 between the arm function control valve 45 and the bucket function control valve 46.

The present hydraulic system 30 has a relatively large variable displacement first pump 50 that provides the majority of the flow needed to operate the hydraulic functions as demanded by the operator. The second pump 51, that may have either a fixed or a variable displacement, provides flow to operate the boom hydraulic function 34, then the swing hydraulic function 33, and then arm hydraulic function 35 in that priority order, in addition to supplementing the output from the first pump 50 when those three functions do not consume all the flow produced by the second pump.

The outlet of the second pump 51 is connected to bypass node 55 at the upstream end of the bypass passage 85 formed by the series connection of the bypass orifices 80 in the control valves 41-47. A pump outlet check valve 49 isolates the pressure relief valve 48 of the second pump 51 from the system relief valve 61. The secondary supply conduit 67, in which the flow summation node 74 is defined, also is coupled through a circuit branch, comprising a check valve 87 and an orifice 86, to the upstream bypass node 55 of the bypass passage 85. That check valve 87 blocks the output flow of the second pump 51 at bypass node 55 from entering the secondary supply conduit 67. Thus the flow from the second pump 51 enters the bypass passage 85 and flows therein through the series connection of the control valve bypass orifices 80.

Figure 7:
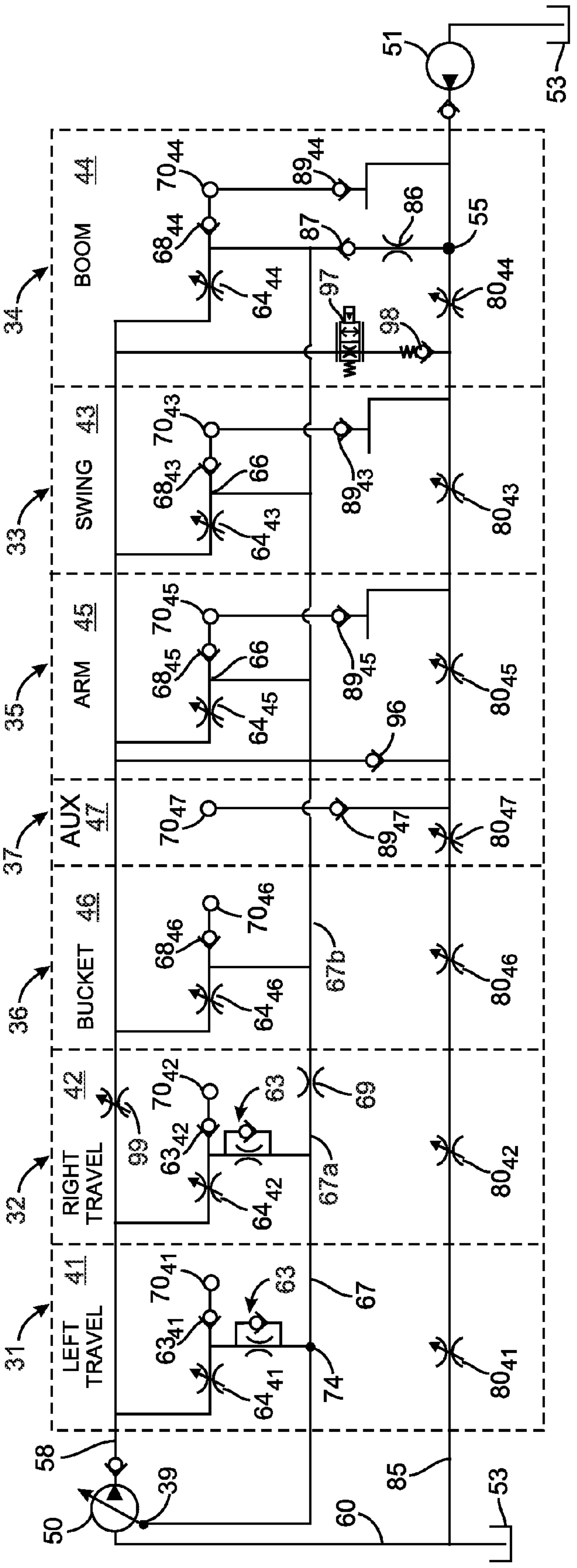
FIG. 7 is a schematic diagram of the hydraulic system in FIG. 2 with certain internal components separated from the control valves and rearranged according to their functional relationships.

FIG. 7 is a simplified illustration of the first hydraulic system 30 showing those components that control the displacement of the first pump 50. The variable flow source orifices 64 and the bypass orifices 80 in the various control valves 41-47 are shown arranged in a more functional relationship. In that drawing, a subscript for a reference number denotes that the corresponding element is part of a particular control valve designated by the subscript numeral (e.g. bypass orifice $\mathbf{80}_{41}$ is part of the first control valve 41), whereas use of that reference number without a subscript refers to that element in general.

The variable flow source orifices $\mathbf{64}_{41}$-$\mathbf{64}_{46}$ of the six control valves 41-46 are connected in parallel between the supply conduit 58 from the first pump 50 and the flow summation node 74 defined in the secondary supply conduit 67. The bypass orifices $\mathbf{80}_{41}$-$\mathbf{80}_{47}$ in all seven control valves 41-47 are connected in series between the flow summation node 74 and the return conduit 60 to the tank 53 and form the bypass passage 85. Note that the bypass orifices and thus their respective control valves are connected in that series in a first order going from right to left in FIG. 7. That first order defines the priority which the control valves have to using the fluid flowing through the bypass passage 85. Note further that the control valves 41-47 are connected to the supply conduit 58 and to the secondary supply conduit 67 in a second order, going from left to right, which defines the priority to using the fluid flow produced by the first pump 50. Specifically, the second order is opposite to the first order.

Ignore for the moment the flow provided by the second pump 51 and assume initially that all the control valves 41-46 are in the center position in which both their hydraulic functions are inactive. In that inactive state, the output from the first pump 50, applied to supply conduit 58, passes through the variable flow source orifices $\mathbf{64}_{41}$-$\mathbf{64}_{46}$ into the summation node 74. Because all of those control valve flow source orifices are now shrunk to relatively small flow areas, a relatively small amount of fluid flows from the first pump 50 to the summation node 74. At this time, all the control valve bypass orifices $\mathbf{80}_{41}$-$\mathbf{80}_{47}$ in the bypass passage 85 are enlarged to their maximum size, thereby having relatively large flow areas, Therefore, in this inactive state of the hydraulic system 30, fluid flows relatively unimpeded from the summation node 74 through devices 86 and 87 into the bypass passage 85 and there through into the return conduit 60. As a result, the pressure at the flow summation node 74 is at a relatively low level. That low pressure level is conveyed to the load sense control port 39 of the variable displacement first pump 50. Note that in this hydraulic function inactive state, the output from the second pump 51 also flows relatively unrestricted through the bypass passage 85 into the return conduit 60.

When one or more of the hydraulic functions 31-37 is active, its respective control valve 41-47 is displaced from the center position, which increases the size of the metering orifice 75 thereby conveying fluid from the metering orifice inlet 70 to the associated hydraulic actuator. That displacement of the control valve also increases the size of its variable flow source orifice 64, thereby increasing flow from the outlet of the first pump 50 into the flow summation node 74 and to the control valve's metering orifice inlet 70. At the same time, the control valve's bypass orifice 80 decreases in size restricting flow through the bypass passage 85 and into the return conduit 60. Restricting the bypass passage flow initially changes the pressure at the flow summation node 74 that is coupled to the load sense control port 39 of the first pump 50. That pressure change alters the displacement of the first pump to increase fluid flow into supply conduit 58 in order to maintain the "pump margin," as previously described.

When the flow summation node pressure is sufficiently great to overcome the load force acting on the hydraulic actuator connected to the displaced control valve, fluid begins to flow through the respective metering orifice 75 to drive that hydraulic actuator.

At the same time, one or more of the other control valves 41-47 also may be displaced from the center position to activate its associated hydraulic function. The respective variable flow source orifice 64 of such other control valve also is conveying fluid from the supply conduit 58 into the flow summation node 74. Because all the variable flow source orifices 64 are connected in parallel, the same pressure differential is across each of those orifices. That pressure differential and the cross sectional area of each flow source orifice determines the amount of flow through a given orifice. The total flow into the flow summation node 74 is the aggregate of the individual flows through each variable flow source orifice 64. As a result, the sum of the areas, that each variable flow source orifice is open, determines the aggregate flow into the flow summation node 74 and thus controls the output flow from the variable displacement first pump 50. The respective flow area of the metering orifice 75 in each of the first six control valves 41-46 and the respective load forces on actuators 17, 18, 19, 20, 22 and 26 determine the amount of flow each of their actuators receives from the flow summation node 74.

When all the hydraulic actuators 31-37 stop operating, their associated control valves 41-47 are returned to the center position by whatever apparatus controls that valve. In the center position, the workports 76 and 78 of the control valves are disconnected from the metering orifice inlet 70, cutting off fluid flow from the flow summation node 74 to the hydraulic actuators. In addition, all the variable flow source orifices 64 are shrunk to relatively small sizes which reduces the flow from the supply conduit 58 to the flow summation node 74. Returning all the control valves 41-47 to the center position also enlarges the size of their bypass orifices 80, thereby releasing the flow summation node pressure into the return conduit 60. This decreases the pressure at the flow summation node 74, which pressure is communicated to the load sense control port 39 of the first pump 50. That pressure level decrease, reduces the displacement of the first pump 50.

The above description of controlling the displacement of the first pump 50 ignored operation of the second pump 51. The output flow from the second pump 51 is applied to bypass node 55 at the upstream end of the bypass passage 85 through which that flow can pass to the return passage 60 at the downstream end, depending on the state of the variable bypass orifices 80 in each control valve 41-47. When one of the boom, swing or arm function 34, 33 or 35, respectively, is operating, fluid from the bypass passage 85 may be fed through bypass supply check valve 89 in that function to the metering orifice inlet 70 of the associated control valve 43-45. At the metering orifice inlet 70, the fluid from the bypass passage 85 combines with fluid from the first pump 50 received from the supply conduit 58 via the flow source orifice 64 and the source control valve 68. The contribution of fluid from the second pump 51 adds to the amount of fluid from the first pump 50 that is consumed by the respective hydraulic function.

With continuing reference to FIG. 7, the flow in the bypass passage 85 from the second pump 51 is available initially for powering the boom function 34. Specifically, the flow in the bypass passage 85 can pass through the bypass supply check valve $\mathbf{89}_{44}$ to the metering orifice inlet $\mathbf{70}_{44}$ of the fourth control valve 44. If the boom function 34 is active, i.e., the fourth control valve 44 has been displaced from the center position, the respective bypass orifice $\mathbf{80}_{44}$ is reduced in size thereby restricting fluid from flowing farther downstream in the bypass passage 85 and directing flow to the metering orifice inlet $\mathbf{70}_{44}$. If, however, the boom function is inactive, the second pump's outlet flow continues through the bypass passage 85 to the third control valve 43 for the swing function 33.

If the swing function 33 is active, the fluid flows through the bypass supply check valve $\mathbf{89}_{43}$ for that function and to the metering orifice inlet $\mathbf{70}_{43}$. If, however, the swing function 33 is inactive, the flow from the second pump 51 continues through the bypass passage 85 to the control valve 45 for the arm function 35. That fluid is available to pass through the arm function bypass check valve $\mathbf{89}_{45}$ to supply the metering orifice inlet $\mathbf{70}_{45}$ when the arm function 35 is active. If that is not the case, the flow continues through the bypass passage 85 to the bypass outlet 81 of the left travel control valve 41, at the downstream end of that passage, from which it flows into the tank return conduit 60.

In this manner, the boom, swing, and arm functions 34, 33 and 35, respectively, receive fluid from the second pump 51 via the bypass passage 85. The order of those control valves along that bypass passage 85 determines the priority that the respective functions have to use of that fluid. It should be appreciated that one or more of the boom, swing and arm functions 34, 33, and 35 may be operating simultaneously and not requiring all the flow from the second pump 51. In which case, several of those functions use the second pump flow to operate their respective hydraulic actuator.

With reference to FIGS. 2 and 7, if the boom, swing and arm hydraulic functions 34, 33 and 35, respectively, are not consuming all the fluid in the bypass passage 85 from the second pump 51, the excess fluid can flow through the circuit branch formed by the cross coupling check valve 98 and the orifice in the cross coupling valve 97. Flow through that circuit branch supplements the fluid flow from the first pump 50 that is directed into the secondary supply conduit 67 and available to all the functions, except the auxiliary function 37. Note that the auxiliary function 37 only obtains fluid from the bypass passage 85 and not from the primary or secondary supply conduits 58 and 67.

It is apparent that the boom, swing and arm hydraulic functions 34, 33, and 35, respectively, can receive fluid from both the first pump 50, via the secondary supply conduit 67, and from the second pump 51 via the bypass passage 85. Because the two pumps 50 and 51 may operate at different output pressure levels, it is necessary to keep those pressure levels isolated. This is accomplished by the source check valve 68 that couples the metering orifice inlet 70 for each of the valves to the secondary supply conduit 67 and the bypass supply check valve 89 that couples that inlet to the bypass passage 85. That pair of check valves allows fluid from both of the pumps to be applied to the metering orifice inlet 70.

While raising the boom 13, the swing or other hydraulic function requiring a lower pressure must maintain sufficient torque to accelerate at an acceptable rate. Under this command scenario, flow from the second pump 51 will be directed to the boom function 34 via its connection to the bypass passage 85 so that the boom may operate at the required pressure. The lower pressure swing function 33 operates using fluid from the first pump 50 that is running at a lower output pressure level than the second pump 51. The swing hydraulic function, however, may require a higher pressure level than the first pump output in order to accelerate at an acceptable rate. Therefore, the third hydraulic valve 43 for the swing function 33 receives some of the fluid from bypass node 55, at the upstream end of the bypass passage 85, that would otherwise go to the boom function 34. That fluid is conveyed through a diverter circuit branch 52 (FIG. 2). To ensure that the boom function 34 maintains priority, an orifice 54 is placed in the diverter circuit branch 52 to limit the flow diverted to the swing function.

It is desirable on excavators that travel functions 31 and 32 receive priority with respect to the use of hydraulic fluid over the other hydraulic functions. Therefore, when the travel functions are active, their demand for fluid is met by allocating as much of the output flow from the first pump 50, as is required to properly operate the travel functions. This is accomplished by operating a travel priority valve 99 to insert a flow restriction in the supply conduit 58 between the travel functions 31 and 32 and the other hydraulic functions 33-37.

When only one travel function 31 or 32 is operating, most of its flow requirement will be provided by the first pump 50 via the connection to the supply conduit 58. A sizeable portion (e.g. 25%) of the travel function flow requirement, however, can come from the second pump 51. Since the other hydraulic functions are inactive, the flow from the second pump 51 entering the bypass passage 85 is restricted by the decreased size of the bypass orifice 80 at the active travel function. This restriction forces that bypass flow through the cross connect check valve 96 and into the supply conduit 58, thereby supplementing the fluid in the supply conduit from the first pump 50. The combined flow then is conveyed through the variable flow source orifice 64 of the travel function control valve 41 or 42 to the flow summation node 74. This combined flow affects the displacement control of the first pump 50 to account for the contribution of flow from the second pump 51. In other words, the first pump's displacement is decreased to account for the flow provided by the second pump 51.

If one of the other hydraulic functions, such as the bucket function 36 is commanded while a travel function 31 or 32 is active, the flow source orifice 64 in the control valve for that other hydraulic function conveys fluid from the supply conduit 58 into a second section 67*b* of the secondary supply conduit 67. The second section 67*b* is coupled to a first section 67*a* by a fixed separation orifice 69 and the travel functions 31 and 32 are connected to the first section 67*a*. The separation orifice 69 limits the flow that is fed into the second section 67*b* by the other hydraulic function from entering the first section 67*a* and reaching the travel functions. Specifically the separation orifice 69 limits the additional flow that is conveyed to the travel functions due to the pump margin that appears across the orifice. The size of the fixed separation orifice 69 restricts the amount of additional flow to a predefined additional amount, beyond that which normally occurs when only the travel function is active.

When both travel functions 31 and 32 are active, it is necessary to prevent more than a maximum allowable flow to be conveyed to their hydraulic actuators 20 and 22. This is accomplished by the fixed orifice and check valve arrangement of the function flow limiter 63 in each travel function. For example, if one of the travel functions stalls while both those functions are commanded to the maximum level, that non-consumed supply flow in the stalled function passes through the associated function flow limiter 63 into the secondary supply conduit 67. From the secondary supply conduit 67, the non-consumed supply flow is conveyed through the check valve of the function flow limiter 67 in the still active travel function. Nevertheless, the flow from the stalled function is limited by the orifice of its function control limiter 63 because the margin pressure appears across that orifice. Under typical operating conditions, the flow through the function control limiter orifice in the stalled function will be sufficiently small so that a problem is not caused in the still active travel function.

From FIGS. 2 and 7, it is apparent that the two travel functions 31 and 32 have priority over consuming flow from the first pump 50 and will receive fluid from the second pump only if such fluid is not required for operating the other hydraulic functions 33-37. The boom function 34, swing function 33, and the arm function 35 have priority over the use of the fluid supplied by the second pump 51, because of their order of connection in the bypass passage 85. Furthermore, each of those latter functions 33, 34, and 35 can also consume fluid from the supply conduit 58 that is not consumed by the travel functions 31 and 32. The bucket function 36 can only consume fluid from the primary and secondary supply conduits 58 and 67 and the auxiliary function 37 only consumes fluid from the bypass passage 85.

Each of the third and fifth control valves 43 and 45 has its metering orifice inlet 70 coupled to its flow outlet 66 and to the bypass passage 85 by separate source and bypass supply check valves 68 and 89. Flow from the bypass passage 85 to the metering orifice inlet 70 for each of those control valves 43 and 45 is affected by the size of the bypass orifice 80 in each control valve that is upstream in the bypass passage. For example, the flow through the bypass supply check valve 89 for the fifth valve 45 is affected by the bypass orifices 80 in the third and fourth control valves 43 and 44. That configuration is referred to as a "series connection" of the control valve metering orifices 80 to the bypass passage 85.

Figure 8:
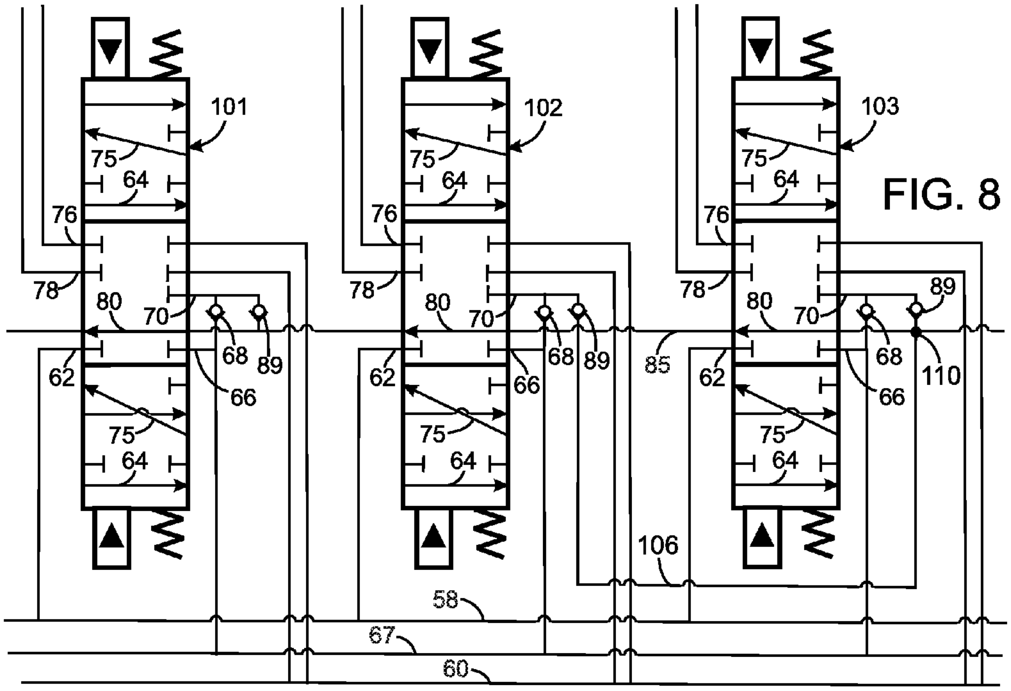
FIG. 8 is an alternative connection of three control valves in the control valve assembly.

FIG. 8 illustrates a "parallel connection" of control valve metering orifice inlets 70 to the bypass passage 85. Control valves 101 and 103 are connected in the identical manner as the fifth control valve 45 in FIG. 2. The bypass supply check valve 89 for control valve 102, however, is not connected to the bypass passage 85 upstream of that control valve and downstream of the adjacent control valve 103, i.e. between control valves 102 and 103. Instead the bypass supply check valve 89 for control valve 102 connects the metering orifice inlet 70 of that control valve to an intermediate node 110 in the bypass passage 85 upstream of control valve 103, i.e., at the same point in the bypass passage where the bypass supply check valve 89 for control valve 103 is connected. Therefore, the supply of fluid from the bypass passage 85 to control valve 102 is not affected by the size of the bypass orifice 80 in control valve 103, because the fluid flows from right to left through the bypass passage 85 in this example.

Figure 9:
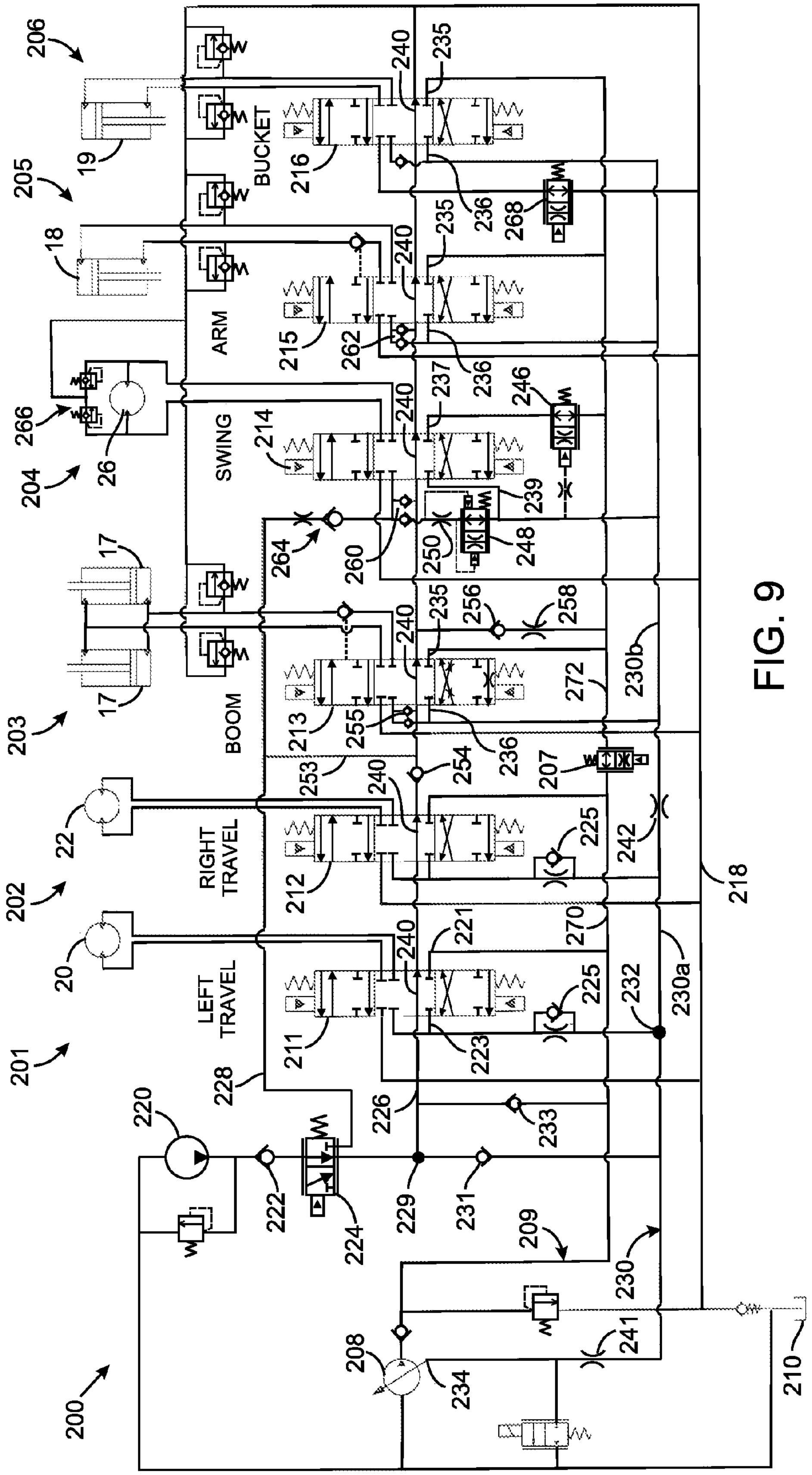
FIG. 9 is a diagram of a second hydraulic system according to the present invention.

FIG. 9 illustrates a second hydraulic system 200 that embodies the present inventive concept. This hydraulic system 200 has a left travel function 201, and right travel function 202, a boom function 203, a swing function 204, an arm function 205, and a bucket function 206.

A variable displacement, first pump 208 draws fluid from a tank 210 and furnishes that fluid under pressure into a supply conduit 209. The supply conduit 209 has a two-position proportional supply valve 207 located between the left and right travel functions 201 and 202 and the remaining hydraulic functions 203-206.

The second hydraulic system 200 has a fixed displacement second pump 220 which also draws fluid from the tank 210 and furnishes that fluid under pressure through a supply check valve 222 to a boom/arm selector valve 224. The boom/arm selector valve 224 directs the output flow from the second pump 220 into either a function supply conduit 228 or a bypass node 229 at the upstream end of a bypass passage 226. The bypass node 229 also is connected by a check valve 231 to the secondary supply conduit 230. That check valve 231 prevents the flow from the second pump 220 from flowing into the secondary supply conduit and thereby maintains the flow priority for the boom, swing, and arm functions in that priority order. Another check valve 233 allows fluid from the fixed displacement second pump 220 that is not otherwise consumed by certain hydraulic functions to flow into the supply conduit 209 thus supplementing flow from the first pump 208 for other hydraulic functions. This reduces the engine power drawn by the first pump 208.

Each hydraulic function 201, 202, 203, 204, 205 and 206 respectively comprises a control valve 211, 212, 213, 214, 215 and 216 and the associated hydraulic actuator 20, 22, 17, 26, 18 and 19. All the control valves 211-216 are connected to the supply conduit 209 and to a return conduit 218 leading back to the tank 210. The control valves 211-216 are open-center, three-position types and may be a solenoid operated spool type valve, for example. Each control valve 211-216 has two open states in which fluid from the supply conduit 209 is fed to the associated hydraulic actuator 17-26 and fluid from the actuator is returned through the valve to the tank return conduit 218. Depending upon which open state is used, the hydraulic actuator is driven in one of two directions.

The first and second control valves 211 and 212, for the travel functions 201 and 202, have a supply port 221 that is directly connected to the supply conduit 209. An outlet port 223 of those control valves 211 and 212 is coupled by a function flow limiter 225 to a first section 230*a* of the secondary supply conduit 230. The third, fifth and sixth control valves 213, 215 and 216 have similar supply ports 235 that are connected directly to the supply conduit 209 and outlet ports 236 that are connected directly to a second section 230*b* of the secondary supply conduit 230.

The fourth control valve 214 for the swing function 204 has its supply port 237 coupled by a proportional flow limit valve 246 to the supply conduit 209 and has an outlet port 239 that is connected directly to the second supply conduit section 230*b*. Flow limit valve 246 is pilot operated by the pressure at the outlet port 239. The swing function 204 has a flow limiter that limits a magnitude of the flow from the variable displacement pump from exceeding the maximum flow rating for the swing hydraulic actuator 26. That flow limiter includes a flow valve 248 in series with a fixed orifice 250 through which fluid being supplied to the swing hydraulic actuator 26 travels. The flow valve 248 that is normally open and is pilot operated by the pressure differential across the orifice 250. Thus when the flow across the fixed orifice 250 exceeds a preset level, thereby producing a pressure drop of a given magnitude, the flow valve 248 begins to close proportionally thereby restricting the flow to the swing hydraulic actuator 26.

The first supply conduit section 230*a*, in which a flow summation node 232 is defined, is coupled by a fixed summation orifice 242 to the second supply conduit section 230*b*. The first supply conduit section 230*a* of the secondary supply conduit 230 is coupled by a fixed orifice 241 to the displacement control input 234 of the first pump 208. When a control valve 211-216 is open, fluid from the supply conduit 209 is applied to the flow summation node 232 and the amount of that fluid application is proportional to the degree to which the respective control is open.

The control valves 211-216 also have bypass orifices 240 that are connected in series to form the bypass passage 226 between the bypass node 229 and the tank return conduit 218.

The bypass passage 226 along with check valve 231 also provide a fluid path between the summation node 232 and the return conduit 218. When all the control valves 211-216 are in the closed, center position, their bypass orifices 240 are enlarged to provide a relatively a large flow path which permits fluid to pass easily from the bypass node 229 to the return conduit 218. When a control valve 211-216 opens, its bypass orifice 240 shrinks restricting flow through the bypass passage 226, which causes pressure at the summation node 232 to increase, thereby altering the displacement of the first pump 208.

Note that there are sets of dual check valves 255, 260 and 262 the third, fourth and fifth control valves 213, 214, and 215, respectively. When the bypass passage 226 has a proper pressure therein, one of these check valves can open to supply fluid from the bypass passage to the respective control valve. The other check valve in the set prevents that fluid from flowing backwards into the secondary supply conduit 230 or into the supply conduit 209 in the open state of the respective valve. These pairs of check valves 255, 260 and 262 allow fluid from both the supply conduit 209 and the fixed displacement second pump 220 to be supplied to the respective hydraulic function.

With continuing reference to FIG. 9, when either of the boom up or the arm in motions is commanded, the flow from the fixed displacement second pump 220 is respectively directed to the boom or arm function 203 or 205. This is accomplished by activating the boom/arm selector valve 224 to proportionally direct the flow from the second pump 220 into the function supply conduit 228. This prevents all the fixed displacement pump flow from being consumed by the travel functions 201 and 202 and importantly from being directed into the supply conduit 209 through the check valve 233. The flow in the function supply conduit 228 is directed into the bypass passage 226 through branch 253 at the boom function 203. Note that check valve 254 in the bypass passage 226 blocks this flow from traveling back to the bypass node 229. Thus, under all system conditions, if the boom function 203 is commanded, the flow from the second pump 220 is directed with highest priority to maintain boom flow within the pressure limits of that function. In this case where a boom up operation is commanded, the bypass orifice 240 of the boom control valve 213 closes slightly, thereby forcing the fluid that has entered the bypass passage 226 to flow through check valve 255 and the boom control valve to the boom hydraulic actuators 17. This flow supplements any flow that would otherwise be drawn from the supply conduits 209 and 230.

Furthermore, during a digging operation of the excavator 10, when the arm function 205 is active, the boom/arm selector valve 224 also sends flow from the fixed displacement second pump 220 into the function supply conduit 228. This flow also passes through the branch 253 into the bypass passage 226 and from there through to the arm function 205. Since the arm control valve 215 for that function has a reduced bypass orifice 240, the bypass passage flow is forced through a check valve 262 and the arm control valve to power the arm hydraulic actuator 18. It is quite common during a digging operation that the arm function 205 requires a higher pressure than the bucket function 206. The second hydraulic system 200 maintains the higher pressure from the second pump 220 for the arm function, while the variable displacement first pump 208 is allowed to run at a lower pressure as required by the bucket function 206.

Note that between the boom function 203 and the swing function 204, the bypass passage 226 is coupled through a check valve 256 and a fixed orifice 258 to the supply conduit 209. This circuit branch allows fluid that is not consumed by the arm function 205 to be directed into the supply conduit 209 from which it can be used by other hydraulic functions. Assuming that the boom function 203 and the swing function 204 are inoperative, when the arm function 205 is active, its bypass orifice 240 in control valve 215 is at least partially closed allowing fluid to flow into that function from the bypass passage 226 via the check valve 262. Any fluid that is not consumed by the arm function 205 flows through the check valve 256 and the fixed orifice 258. The fixed orifice 258 allows the pressure in the bypass passage 226 to be maintained so that the arm function will receive pressurized fluid.

When boom up, swing, and another lower pressure operation, such as arm in or bucket curl, are being commanded, the swing function 204 needs to maintain sufficient torque to accelerate properly. Under this command scenario, the output flow from the fixed displacement second pump 220 is directed to the boom function 203 via the function supply conduit 228 and that function thereby operates at the required pressure. The boom in or bucket curl operation are powered from the first pump 208 at a lower pressure. The swing function 204, in order to accelerate, requires a higher pressure than the variable displacement pump 208 is producing. Therefore, the swing function 204 now is connected through the check valve and orifice combination 264 that directs some of the higher pressure flow in the function supply conduit 228 from the boom function 203 to the swing function. The size of orifice at 264 is selected to limit the flow that is diverted from the boom function.

Referring still to FIG. 9, the variable displacement first pump 208 has a significantly higher flow capacity than can be allowed into the travel hydraulic actuators 20 and 22 without an over speed condition occurring. When only one of the travel functions 201 and 202 is operating, it is in control of the first pump 208 and thus receives the majority of its flow requirement from that pump. The remainder of the flow requirement is satisfied from the fixed displacement second pump 220 via selector valve 224 and check valve 233 supplying that fluid into the supply conduit 209. When a single travel function is commanded along with an implement function, such as the bucket function 206, any additional flow to the travel functions 201 and 202 is limited by the fixed summation orifice 242 in the secondary supply conduit 230. As described previously with respect to the first hydraulic system 30, the same type of flow limiting occurs when both travel functions are active.

The second hydraulic system 200 implements a throttling technique that gives the travel functions 201 and 202 priority to the use of the fluid flow. For that technique, the supply valve 207 separates the supply conduit 209 into a first section 270 to which only the travel functions 201 and 202 are connected and into a second section 272 to which the other functions 203-206 are connected. When a travel function is commanded, this supply valve 207 transitions from an open position to a restricted position to limit the amount of flow allowed from the first pump 208 to the non-travel functions 203-206. The supply valve 207 closes proportionally to the highest pressure produced in the actuators for the two travel functions 201 and 202. In addition, the fixed summation orifice 242 in the secondary supply conduit 230 limits the amount of pump outlet flow commanded by the travel functions 201 and 202 that is allowed to flow to the implement functions 203, 205 and 206 during this mode of operation.

To avoid high pressure flow losses across the cross port relief valves 266 at the hydraulic actuator 26 of the swing function 204, a flow limit valve 246 is located in the flow path through the swing control valve 214 between the supply conduit 209 and the second supply conduit section 230*b*. When the pressure in that second supply conduit section 230*b* rises above a preset level that is a little higher or a little lower than the cross port relief valve pressure threshold, the pilot operated control valve implementing this flow limit valve 246 closes to thereby limit the swing function's inlet flow from the first pump 208. Note that the flow limit valve 246 may be placed on either the supply conduit side or the secondary supply conduit side of the swing control valve 214.

To improve productivity and match the pressure load of the bucket function 206 and the boom function 203, a throttling loss is added in the exhaust conduit of the bucket function between the control valve 216 and the tank return conduit 218. This restriction varies in proportion to the boom up command. In the second hydraulic system 200, this restriction is implemented by a proportional control valve 268 that is operated in response to the magnitude of the boom command. Alternatively, such a restriction could be implemented by a variable orifice on the boom spool through which the oil exhausting from the bucket function flows.

The foregoing description was primarily directed to a certain embodiments of the industrial vehicle. Although some attention was given to various alternatives, it is anticipated that one skilled in the art will likely realize additional alternatives that are now apparent from the disclosure of these embodiments. Accordingly, the scope of the coverage should be determined from the following claims and not limited by the above disclosure.

The invention claimed is:

1. A control valve assembly for a hydraulic system having a variable displacement first pump and a second pump which supply fluid from a tank for powering a plurality of hydraulic actuators, the control valve assembly comprising:

a supply conduit connected to the first pump for conveying fluid to the plurality of hydraulic actuators;

a return conduit for conveying fluid to the tank;

a plurality of control valves, each having a first inlet coupled to receive fluid from the supply conduit and a variable metering orifice for controlling flow of fluid from the first inlet to one of the plurality of hydraulic actuators, each control valve also including a variable bypass orifice, wherein the variable bypass orifices of the plurality of control valves are connected in series between a bypass node and the return conduit thereby forming a bypass passage, and wherein the bypass node is operatively connected to receive fluid from the second pump;

a plurality of first flow direction limiting devices, each providing a path through which fluid is able to flow only from the supply conduit to the first inlet of one of the plurality of control valves; and a plurality of second flow direction limiting devices, each providing another path through which fluid is able to flow only from the bypass passage to the first inlet of one of the plurality of control valves.

2. The control valve assembly as recited in claim 1 wherein in each of the plurality of control valves, the variable bypass orifice decreases in size as the variable metering orifice increases in size.

3. The control valve assembly as recited in claim 1 further comprising a displacement control circuit operatively coupled to control displacement of the first pump in response to demand for fluid by the plurality of hydraulic functions.

4. The control valve assembly as recited in claim 3 further comprising a circuit branch which conveys fluid from the displacement control circuit to the bypass node.

5. The control valve assembly as recited in claim 3 wherein the displacement control circuit comprises:

a flow summation node coupled to a displacement control port for the first pump; and each of the plurality of control valves having a variable source orifice through which fluid flows from the supply conduit to the flow summation node, wherein the variable source orifice increases in size as the variable metering orifice in the same control valve increases in size.

6. The control valve assembly as recited in claim 5:

further comprising an additional control valve having a second inlet coupled to receive fluid from the supply conduit and having a variable metering orifice for controlling flow of fluid from the second inlet to another hydraulic actuator; and wherein the displacement control circuit further comprises a secondary supply conduit in which the flow summation node is defined and an orifice separating the secondary supply conduit into first section and a second section, wherein the variable source orifice of the additional control valve is connected to the first section and the variable source orifices of the plurality of control valves are connected to the second section.

7. The control valve assembly as recited in claim 6 further comprising an orifice in the supply conduit between where the additional control valve is connected to the supply conduit and where the plurality of control valves are connected to the supply conduit.

8. The control valve assembly as recited in claim 5 wherein at least one of the plurality of control valves including a flow limit valve for restricting fluid flow through the variable source orifice in response to pressure at the flow summation node.

9. The control valve assembly as recited in claim 1 wherein each first flow direction limiting device and each second flow direction limiting device comprises a check valve.

10. The control valve assembly as recited in claim 1 further comprising a flow control device through which fluid flows from the bypass passage into the supply conduit.

11. The control valve assembly as recited in claim 10 wherein the flow control device opens and closes in response to pressure in the bypass passage.

12. The control valve assembly as recited in claim 10 wherein the flow control device is connected to the bypass passage between two of the plurality of control valves.

13. The control valve assembly as recited in claim 1 further comprising a series connection of a check valve and an orifice through which fluid flows from the bypass passage into the supply conduit.

14. The control valve assembly as recited in claim 1 wherein each of the plurality of second flow direction limiting devices connects one of the first inlets to the bypass passage between a different pair of the plurality of control valves.

15. The control valve assembly as recited in claim 1 wherein the first inlets for two of the plurality of control valves are connected by second flow direction limiting devices to the bypass passage between the same pair of the plurality of control valves.

16. The control valve assembly as recited in claim 1 wherein the second pump is a variable displacement pump.

17. The control valve assembly as recited in claim 1 wherein the second pump is a fixed displacement pump.

18. The control valve assembly as recited in claim 1 wherein connection of the variable bypass orifices in series defines a first order in which the plurality of control valves are connected between the bypass node and the return conduit, and wherein the plurality of control valves are connected in a different second order to the supply conduit.

19. The control valve assembly as recited in claim 18 wherein the different second order is opposite to the first order.

20. The control valve assembly as recited in claim 1 further comprising at least one additional control valve, each having a second inlet coupled to receive fluid from the supply conduit without receiving fluid from the bypass passage and a variable metering orifice for controlling flow of fluid from the second inlet to another hydraulic actuator.

21. The control valve assembly as recited in claim 1 further comprising at least one additional control valve, each having a second inlet coupled to receive fluid from only the bypass passage and a variable metering orifice for controlling flow of fluid from the second inlet to another hydraulic actuator.

22. A control valve assembly for a hydraulic system having a variable displacement first pump and a second pump which supply fluid from a tank for powering a plurality of hydraulic actuators, the control valve assembly comprising:

a supply conduit connected to convey fluid from the first pump for conveying fluid to the plurality of hydraulic actuators;

a return conduit for conveying fluid to the tank;

a flow summation node coupled to a displacement control port for the first pump;

a plurality of control valves, each having a variable metering orifice for controlling flow of fluid from a first inlet to a hydraulic actuator, and having a variable source orifice through which fluid flows from the supply conduit to the flow summation node, wherein the variable source orifice increases in size as the variable metering orifice in the same control valve increases in size, and each control valve including a variable bypass orifice that decreases in size as the variable metering orifice in the same control valve increases in size, wherein the variable bypass orifices of the plurality of control valves are connected in series between a bypass node and the return conduit thereby forming a bypass passage, wherein the bypass node is operatively connected to receive fluid from the second pump and is coupled to the flow summation node;

a plurality of first flow direction limiting devices, each providing a path through which fluid is able to flow only from the supply conduit to the first inlet of one of the plurality of control valves; and a plurality of second flow direction limiting devices, each providing another path through which fluid is able to flow only from the bypass passage to the first inlet of one of the plurality of control valves.

23. The control valve assembly as recited in claim 22 wherein each first flow direction limiting device comprises a source check valve; and each second flow direction limiting device comprises a bypass supply check valve.

24. The control valve assembly as recited in claim 23 further comprising a flow control device through which fluid flows from the bypass passage into the supply conduit.

25. The control valve assembly as recited in claim 24 wherein the flow control device opens and closes in response to pressure in the bypass passage.

26. The control valve assembly as recited in claim 24 wherein the flow control device is connected to the bypass passage between two of the plurality of control valves.

27. The control valve assembly as recited in claim 22 further comprising a series connection of a check valve and an orifice through which fluid flows from the bypass passage into the supply conduit.

28. The control valve assembly as recited in claim 22 further comprising an orifice and a check valve operatively connected in series for conveying fluid from the flow summation node to the bypass node.

29. The control valve assembly as recited in claim 22 further comprising:

an additional control valve having a variable metering orifice for controlling flow of fluid from a second inlet to another hydraulic actuator, and having a variable source orifice through which fluid flows from the supply conduit to the flow summation node, wherein the variable source orifice increases in size as the variable metering orifice in the same control valve increases in size, and the additional control valve including a variable bypass orifice connected in series with the variable bypass orifices of plurality of control valves; and a secondary supply conduit in which the flow summation node is defined and having an orifice separating the secondary supply conduit into first section and a second section, wherein the variable source orifice of the additional control valve is connected to the first section and the variable source orifices of the plurality of control valves are connected to the second section.

30. The control valve assembly as recited in claim 29 further comprising an orifice in the supply conduit between where the additional control valve is connected to the supply conduit and where the plurality of control valves are connected to the supply conduit.

31. The control valve assembly as recited in claim 22 wherein the second pump is a variable displacement pump.

32. The control valve assembly as recited in claim 22 wherein the second pump is a fixed displacement pump.

33. The control valve assembly as recited in claim 22 further comprising an additional control valve having a second inlet coupled to receive fluid from the flow summation node without receiving fluid from the bypass passage, and having a variable metering orifice for controlling flow of fluid from the second inlet to another hydraulic actuator, and further having a variable source orifice through which fluid flows from the supply conduit to the flow summation node, wherein the variable source orifice increases in size as the variable metering orifice in the additional control valve increases in size, and the additional control valve including a variable bypass orifice connected in series with the variable bypass orifices of plurality of control valves.

34. The control valve assembly as recited in claim 22 further comprising at least one additional control valve, each having a second inlet coupled to receive fluid from only the bypass passage and having a variable metering orifice for controlling flow of fluid from the second inlet to another hydraulic actuator.

35. The control valve assembly as recited in claim 22 wherein connection of the variable bypass orifices in series defines a first order in which the plurality of control valves are connected between the bypass node and the return conduit, and wherein the plurality of control valves are connected in a different second order to the supply conduit.

36. The control valve assembly as recited in claim 35 wherein the different second order is opposite to the first order.

* * * * *